(12) United States Patent
Li

(10) Patent No.: US 10,859,770 B2
(45) Date of Patent: Dec. 8, 2020

(54) PRE-EMBEDDED OPTICAL FIBER QUICK CONNECTOR

(71) Applicant: Shenzhen Fibercan Optical Co., Ltd, Guangdong (CN)

(72) Inventor: Yaole Li, Guangdong (CN)

( * ) Notice: Subject to any disclaimer, the term of this patent is extended or adjusted under 35 U.S.C. 154(b) by 0 days.

(21) Appl. No.: 16/492,618

(22) PCT Filed: Apr. 17, 2018

(86) PCT No.: PCT/CN2018/083441
§ 371 (c)(1),
(2) Date: Sep. 10, 2019

(87) PCT Pub. No.: WO2018/214674
PCT Pub. Date: Nov. 29, 2018

(65) Prior Publication Data
US 2020/0049897 A1 Feb. 13, 2020

(30) Foreign Application Priority Data
May 26, 2017 (CN) .......................... 2017 1 0384819

(51) Int. Cl.
G02B 6/36 (2006.01)
G02B 6/38 (2006.01)
(52) U.S. Cl.
CPC ......... G02B 6/3821 (2013.01); G02B 6/3879 (2013.01)

(58) Field of Classification Search
CPC .. G02B 6/3885; G02B 6/3821; G02B 6/3846; G02B 6/3879; G02B 6/36
See application file for complete search history.

(56) References Cited

U.S. PATENT DOCUMENTS

| | | | |
|---|---|---|---|
| 7,942,695 B1 * | 5/2011 | Lu ........................ | H01R 9/0524 439/578 |
| 9,219,331 B1 * | 12/2015 | Liao ..................... | H01R 13/506 |
| 2018/0196211 A1 * | 7/2018 | Agata ...................... | G02B 6/44 |

* cited by examiner

Primary Examiner — Jennifer Doan
(74) Attorney, Agent, or Firm — Prakash Nama; Global IP Services, PLLC

(57) ABSTRACT

Pre-embedded optical fiber connector having an inner core, an insertion core assembly in the inner core, an outer casing, and an intermediate component and a threaded tail sleeve mounted on the inner core; a pre-embedded optical fiber is provided inside the insertion core assembly; an optical cable is inserted into an insertion channel formed by the inner core and the intermediate component; a connecting optical fiber inside the optical cable is inserted into the insertion core assembly; a press block and a push member are provided on the insertion core assembly; the push member is exposed from a first opening on the outer casing; the push member is slidable; the press block presses against and fixes the pre-embedded optical fiber and the connecting optical fiber, and a pressure of the cress block on the pre-embedded optical fiber and the connecting optical fiber varies depending on different positions of the push member.

10 Claims, 7 Drawing Sheets

PRE-EMBEDDED OPTICAL FIBER QUICK CONNECTOR

BACKGROUND OF THE INVENTION

The present invention relates to the technical field of optical fiber communication, and more specifically relates to a pre-embedded optical fiber quick connector.

FTTx (Fiber-to-the-x) technology has been developing rapidly following the development of the general communication industry. Construction works for optical fiber connection being a crucial element of FTTx constructions have been multiplied. Also, connection points that extend to indoor areas in FTTx constructions have posed significantly greater difficulties for FTTx constructions. Therefore, there is an increase in both the volume and difficulty of FTTx constructions. Accordingly, conventional fusing connection can no longer catch up with the requirements for terminal connections of FTTx nowadays. Fusing connection must be replaced by a new way of connection that is much faster and more convenient. Quick connector fulfills such requirements. The use of quick connector has brought ground breaking changes to the current construction works of optical fiber connection. However, an existing quick connector has quite a number of disadvantages: For example, quick connectors in the market are usually pre-embedded optical fiber quick connectors, therefore the quality of connection between the pre-embedded optical fiber and a connecting optical fiber is a very important technical parameter. Quality of connection directly affects the use of the connector. Unsatisfactory connection can directly disable the connector. Besides, an existing quick connector also has the disadvantages of demanding skills to execute the connection and inconvenient adjustment.

BRIEF SUMMARY OF THE INVENTION

The present invention provides a pre-embedded optical fiber quick connector to improve the quality of connection between optical fibers so that displacement of the optical fibers will not occur easily. Also, the present invention has reduced the difficulty of its operation to facilitate convenient adjustment.

A pre-embedded optical fiber quick connector, comprising an inner core (3), an insertion core assembly (4) embedded inside the inner core (3), an outer casing (2) that sleeves on the inner core (3), and an intermediate component (10) and a threaded tail sleeve (11) mounted on the inner core (3); a pre-embedded optical fiber (402) is provided inside the insertion core assembly (4); an optical cable (12) to be connected is inserted into an insertion channel formed by the inner core (3) and the intermediate component (10); a connecting optical fiber (1201) inside the optical cable (12) is inserted into the insertion core assembly (4); wherein a press block (5) and a push member (7) corresponding to the press block (5) are provided on the insertion core assembly (4); the push member (7) is exposed from a first opening (201) provided on the outer casing (2); the push member (7) is slidable when subject to a pushing force; the press block (5) presses against and fixes the pre-embedded optical fiber (402) and the connecting optical fiber (1201), and a pressure of the press block (5) on the pre-embedded optical fiber (402) and the connecting optical fiber (1201) varies depending on different positions of the push member (7).

According to an embodiment, an inclined portion (501) is provided on the press block (5); the push member (7) is slidable relative to the press block (5) to reach different positions of the inclined portion (501) so as to impose different degrees of pressure to the pre-embedded optical fiber (402) and the connecting optical fiber (1201) so as to press the pre-embedded optical fiber (402) and the connecting optical fiber (1201) tightly together or loosen the pre-embedded optical fiber (402) and the connecting optical fiber (1201) with respect to each other.

According to an embodiment, a groove (4051) having a cross section of a partial circular shape and having barbed edges (4052) at two sides of an opening of the groove respectively is provided inside the insertion core (4); the pre-embedded optical fiber (402) and the connecting optical fiber (1201) are inserted into the groove (4051) to complete mutual connection, and are confined within the groove (4051) by the barbed edges (4052).

According to an embodiment, the inner core (3) is provided with a first optical cable guiding hole (303) and a second optical cable guiding hole (305) to guide the optical cable during connection.

According to an embodiment, the optical cable (12) comprises from inside to outside thereof the connecting optical fiber (1201), a coating layer (1204), craft wires (1203) and a jacket (1202).

When the optical cable (12) is an optical cable with a nominal diameter, the intermediate component (10) cooperates with the inner core (3) and the threaded tail sleeve (11) to fix the optical cable with the nominal diameter.

When the optical cable (12) has a diameter smaller than the nominal diameter, the connector also comprises a press connection assembly (9) provided between the inner core (3) and the intermediate component (10) to fix such optical cable having a smaller diameter.

According to an embodiment, an inner side wall of the intermediate component (10) has conical projections (1003) to fix the jacket (1202) of the optical cable with the nominal diameter; the craft wires (1203) of the optical cable with the nominal diameter are partially embedded on threads of the inner core (3) and the intermediate component (10), and are fixed by the threaded tail sleeve (11) so as to form an anti-pulling structure.

According to an embodiment, the press connection assembly (9) comprises a press ring (901), and a pin (902) and a stop ring (903) provided inside the press ring (901); when fixing the optical cable having the smaller diameter, a stop structure is formed by the pin (902) inserted between the coating layer (1204) and the craft wires (1203), and the craft wires (1203) partially embedded between the stop ring (903) and the press ring (901).

According to an embodiment, a first trough (1002) is provided on the intermediate component (10); a second trough (304) is provided on the inner core (3); the press connection assembly (9) is mounted in the first trough (1002) and the second trough (304).

According to an embodiment, the insertion core assembly (4) is mounted into the inner core (3) via a spring (8) and a cover panel (6); after installation, the spring (8) is in a compressed state which presses the insertion core assembly (4) tightly into the inner core (3); two resilient walls (601) of the cover panel (6) are cooperative with second openings (307) provided on the inner core (3), so as to limit the spring (8) in a position within the inner core (3).

According to an embodiment, index matching gel is used during connection between the pre-embedded optical fiber (402) and the connecting optical fiber (1201).

According to the above technical solutions, the pre-embedded optical fiber quick connector provided by the present invention has the following advantages:

The quick connector of the present invention has a pre-embedded optical fiber pre-embedded in the quick connector. The pre-embedded optical fiber, already processed by for example fine grinding, has a more steady performance against insertion loss and return loss due to insertion and removal of the optical fiber, thereby enhancing the quality of optical fiber connection; also, index matching gel is optionally used for connection between the pre-embedded optical fiber and the connecting fiber to further enhance the quality of connection and to lower the technique required for achieving the connection.

The press block 5 presses and fixes the connecting optical fiber and the pre-embedded optical fiber connected together, to ensure that displacement of the connecting optical fiber and the pre-embedded optical fiber will not easily occur after connection such that a high quality of optical fiber connection is ensured.

By means of the cooperation between the push member and the press block such that the push member is driven to act on the press block, different degrees of pressure can be imposed to the pre-embedded optical fiber and the connecting fiber, so as to fix the pre-embedded optical fiber and the connecting optical fiber or loosen them with respect to each other. When they are loosened, the optical cable can be taken out easily for re-reconnection without disassembling any other components of the quick connector, thereby lowering the difficulty of operation and thus enabling more convenient adjustment.

In a preferred embodiment of the present invention, the pre-embedded optical fiber and the connecting optical fiber are mutually connected in the groove having a cross section of a partial circular shape and having barbed edges, and the barbed edges confine the optical fibers within the groove so that the optical fibers will not displace easily, thereby increasing the quality of connection. Also, the groove having the barbed edges provides guiding effect to the inserted optical fibers so that optical fiber connection can be performed more easily. These configurations solve the problems of easy displacement, poor quality of connection and easy sticking out of the optical fibers in the use of V shaped groove to accommodate the optical fibers in a prior art quick connector.

According to a preferred embodiment, the first optical cable guiding hole and the second optical cable guiding hole provided on the inner core guide the optical cable during connection, thereby lowering the difficulty of performing optical fiber connection.

According to a preferred embodiment, the intermediate component cooperates with the inner core and the threaded tail sleeve to fix the optical cable having a nominal diameter. The press connection assembly provided between the inner core and the intermediate component can fix an optical cable having a diameter small than the nominal diameter. By means of these two methods, the present invention supports connection and fixation of optical cables of two different diameters, thereby solving the problem of a prior art connector which can only connects one type of optical cable with a specific diameter.

According to a preferred embodiment, the insertion core assembly is installed inside the inner core via the spring and the cover panel. The resilient force of the spring fixes the insertion core assembly inside the inner core so that insertion core assembly will not displace, while at the same time maintaining a certain degree of mobility to facilitate adjustment. The cover panel can ensure that the insertion core assembly and the spring are limited within the inner core.

BRIEF DESCRIPTION OF THE DRAWINGS

In order to describe clearly the technical solutions of the present invention according to some embodiments, the figures required for illustrating the embodiments and also the prior art will be briefly described below. Obviously, the figures described below are only intended to illustrate some embodiments of the present invention. A person skilled in the art may obtain other figures without the need of any inventive effort based on the figures disclosed herein.

DETAILED DESCRIPTION OF THE INVENTION

In order that a person skilled in this field of art can understand the present invention in a better way, the present invention will be clearly and thoroughly described below with reference to some embodiments and the figures illustrating the embodiments. Obviously, the embodiments described are only some of the possible embodiments of the present invention, and do not include all possible embodiments. All other embodiments obtainable by a person skilled in this field of art without any inventive effort based on the teachings of the embodiment described herein should also fall within the scope of protection of the present invention.

Terms such as "First", "Second" and "Third" etc appearing in the description, claims and the drawings described above are intended to differentiate different subjects, but not intended to describe a particular sequence. Also, terms such as "comprising", "including" and any other variations thereof are intended to mean non-exclusive coverage. For example, a process, method, system, product or equipment that "comprises" a series of steps or modules does not mean that the process, method, system, product or equipment only has the steps or modules as disclosed; by contrast, the process, method, system, product or equipment may optionally include steps or modules that are not described in the description, or other steps or modules that are inherent in the process, method, system, product or equipment.

The present invention will be further described in detail below.

As mentioned in the background, an existing quick connector has the following technical problems:

1. Quick connectors in the market are usually pre-embedded optical fiber quick connectors, therefore the quality of connection between the pre-embedded optical fiber and a connecting optical fiber is a very important technical parameter. Quality of connection directly affects the use of the connector. Unsatisfactory connection can directly disable the connector.

2. An existing quick connector also has the disadvantages of demanding skills to execute the connection and inconvenient adjustment.

3. An existing quick connector can only fix a corresponding optical fiber of a certain diameter at its rear end, and therefore it is required to use different quick connectors for optical fibers having different diameters.

In view of the above disadvantages of the prior art, the present invention has the following objects:

1. To improve the quality of connection between optical fibers, and to ensure that the fibers will not be easily subject to displacement after connection.

2. To reduce the difficulty of operation and facilitate adjustment.

3. To solve the problem of connection with only an optical fiber of a certain diameter, so as to broaden the types of optical fibers that can be connected.

Figure 1:
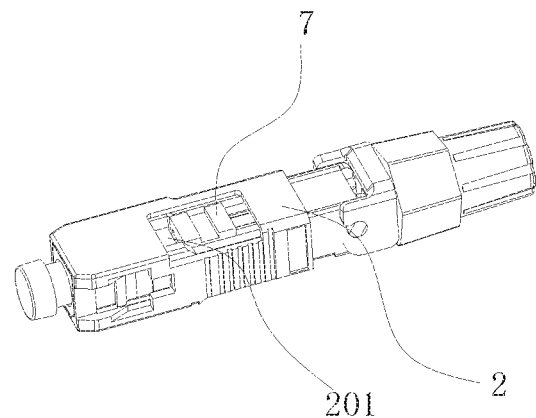
FIG. 1 is a perspective view of the pre-embedded optical fiber quick connector according to an embodiment of the present invention.
Figure 2:
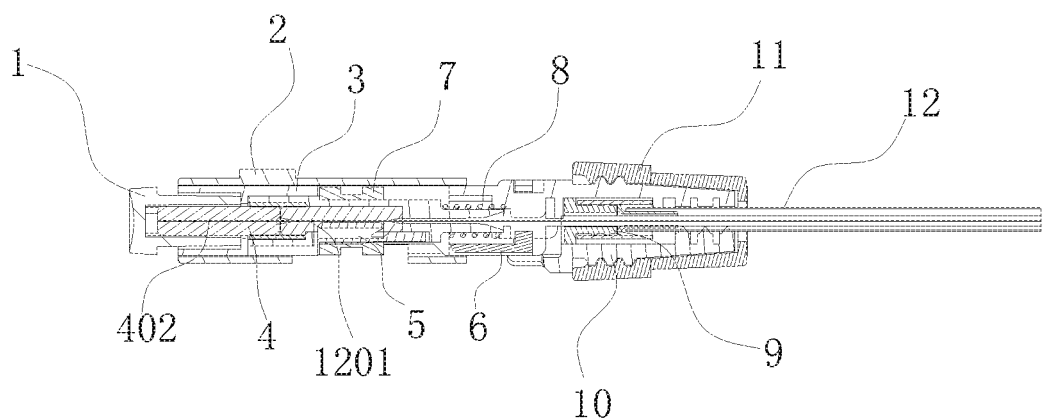
FIG. 2 is a sectional view of the pre-embedded optical fiber quick connector according to an embodiment of the present invention.
Figure 3:
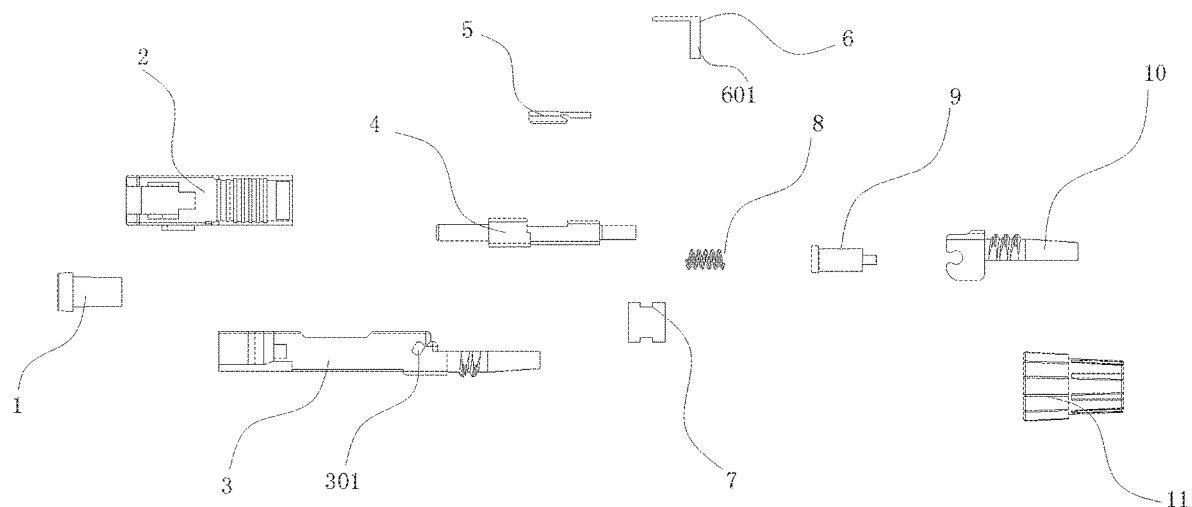
FIG. 3 is an exploded view of the pre-embedded optical fiber quick connector according to an embodiment of the present invention.

The present invention has provided a novel pre-embedded optical fiber quick connector according to an embodiment. FIGS. 1-3 show a perspective view, a sectional view and an exploded view of the quick connector respectively.

As shown in FIGS. 1-3, the pre-embedded optical fiber quick connector comprises:

an inner core 3, a insertion core assembly 4 embedded inside the inner core 3, an outer casing 2 that sleeves on the inner core 3, and an intermediate component 10 and a threaded tail sleeve 11 mounted on the inner core 3; also comprising a dust proof cap 1; a pre-embedded optical fiber 402 is provided inside the insertion core assembly 4; an optical cable 12 to be connected is inserted into an insertion channel formed by the inner core 3 and the intermediate component 10; a connecting optical fiber 1201 inside the optical cable 12 is inserted into the insertion core assembly 4; the pre-embedded optical fiber 402 and the connecting optical fiber 1201 are mutually connected in the insertion core assembly 4.

Specifically, a press block 5 and a push member 7 corresponding to the press block 5 are provided on the insertion core assembly 4; the push member 7 is exposed from a first opening 201 provided on the outer casing 2; the push member 7 is slidable when subject to a pushing force; the press block 5 presses against and fixes the pre-embedded optical fiber 402 and the connecting optical fiber 1201, and a pressure of the press block 5 on the pre-embedded optical fiber 402 and the connecting optical fiber 1201 vary depending on different positions of the push member 7, so that the pre-embedded optical fiber 402 and the connecting optical fiber 1201 mutually connected are being pressed and fixed when the pressure is greater, and are loosened with respect to each other when the pressure is smaller so that the connecting optical fiber 1201 can be taken out for necessary adjustments.

The dust proof cap mainly caps on a ceramic insertion core 401 of the insertion core assembly 4 to prevent any damage to a surface of the insertion core caused by for example dust. Most of the inner core 3 is mounted within the outer casing 2; the outer casing 2 has a certain protective effect over the inner core 3, and the outer casing 2 may cooperate with an adaptor. Other components are mostly mounted on the inner core 3, that is to say, the inner core 3 supports the installation and mutual cooperation between all components of the quick connector.

With continual reference to FIGS. 1-3, in an embodiment of the present invention, the insertion core assembly 4 can be mounted into the inner core 3 via a spring 8 and a cover panel 6; after installation, the spring 8 is in a compressed state which presses the insertion core assembly 4 tightly into the inner core 3, and the cover panel 6 limits the spring 8 in a position within the inner core 3. Specifically, two resilient walls 601 of the cover panel 6 are cooperative with second openings 307 provided on the inner core 3, so as to limit the spring 8 within the inner core. The spring 8 provides a resilient force to press against the insertion core assembly 4 inside the inner core when the insertion core assembly 4 is mounted inside the inner core 3, while providing a certain degree of mobility.

Figure 4:
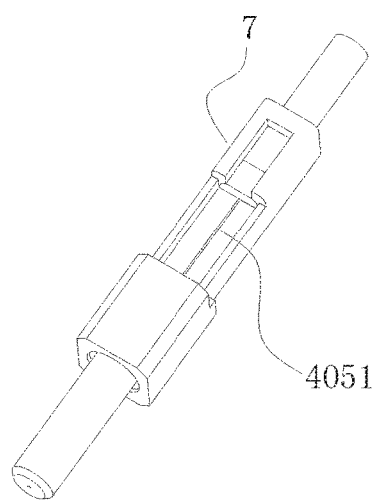
FIG. 4 is a perspective view of the insertion core assembly of the pre-embedded optical fiber quick connector.
Figure 5:
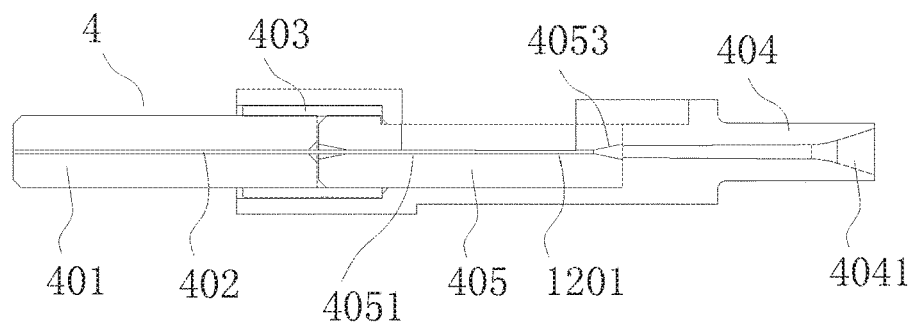
FIG. 5 is a sectional view of the insertion core assembly of the pre-embedded optical fiber quick connector.
Figure 6:
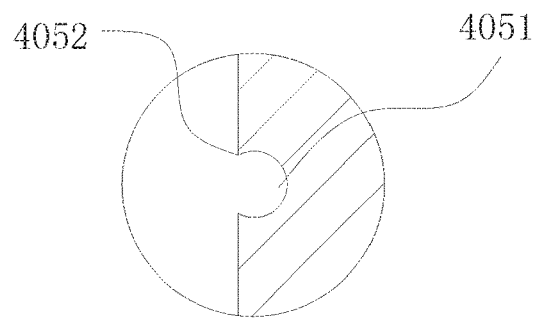
FIG. 6 is a partially enlarged view of the insertion core assembly showing the groove having a cross section of a partial circular shape.

With reference to FIGS. 4-6, a perspective view, a sectional view and a partially enlarged view of the insertion core assembly 4 are illustrated respectively. The insertion core assembly 4 comprises a tail rod 404, a first section ceramic insertion core 401 and a second section ceramic insertion core 405 disposed inside the tail rod 404, the pre-embedded optical fiber 402 disposed inside the first section ceramic insertion core 401 and the second section ceramic insertion core 405, and a copper ring 403 disposed between the first and section ceramic insertion cores 401, 405 and the tail rod 404; the insertion core assembly 4 is the key component of the quick connector. The entire first section ceramic insertion core 401 and part of the second section ceramic insertion core 405 have the pre-embedded optical fiber 402 embedded therein, a remaining part of the second section ceramic insertion core allows insertion of the connecting optical fiber 1201; connection between the pre-embedded optical fiber 402 and the connecting optical fiber 1201 is done inside the second section ceramic insertion core 405.

With continuous reference to FIGS. 4-6, in an embodiment of the present invention, a groove 4051 having a cross section of a partial circular shape and having barbed edges 4052 at two sides of an opening of the groove respectively is provided inside the insertion core 4; the pre-embedded optical fiber 402 and the connecting optical fiber 1201 are inserted into the groove 4051 to complete mutual connection, and are confined within the groove 4051 by the barbed edges 4052. The groove 4051 having the barbed edges 4052 can be provided in the second section ceramic insertion core 405; the pre-embedded optical fiber 402 and the connecting fiber 1201 completes mutual connection within the groove 4051; blocking effect of the barbed edges 4052 can prevent the pre-embedded optical fiber 402 and the connecting optical fiber 1201 from falling off or sticking out from the groove, so as to prevent displacement of the optical fibers to ensure the quality of connection.

As shown in the figures, the groove 4051 having the cross section of the partial circular shape, processed within the second section ceramic insertion core 405, has such partial circular shape having a central angle of circle of more than 180 degrees, with the opening of the groove biased from a center of the circle, thereby forming the two barbed edges 4052 which have blocking and position limiting effects to ensure that the optical fibers will not stick out of the groove when being inserted which otherwise causes misalignment during mutual connection. As such, the quality of optical fiber connection is ensured, and the requirements for technical skills of the user are lowered. The prior arts use a V shaped groove, however such V shaped groove may result in unsatisfactory quality of connection and thus affecting the quality of the connector if the connecting optical fiber or the pre-embedded optical fiber sticks out during mutual connection.

Optionally, a rear end of the groove 4051 of the second section ceramic insertion core 405, that is an end from which the connecting optical fiber 1201 is inserted, is made as a third opening 4053 having an increasing diameter towards a side from which the connecting optical fiber is inserted, so as to guide the connecting optical fiber 1201 to facilitate its insertion; a rear end of the tail rod 404, that is also an end from which the connecting optical fiber 1201 is inserted, is made a fourth opening 4041 also having an increasing diameter towards the side from which the connecting optical fiber is inserted, so as to guide the connecting optical fiber 1201 to facilitate its insertion.

Figure 7:
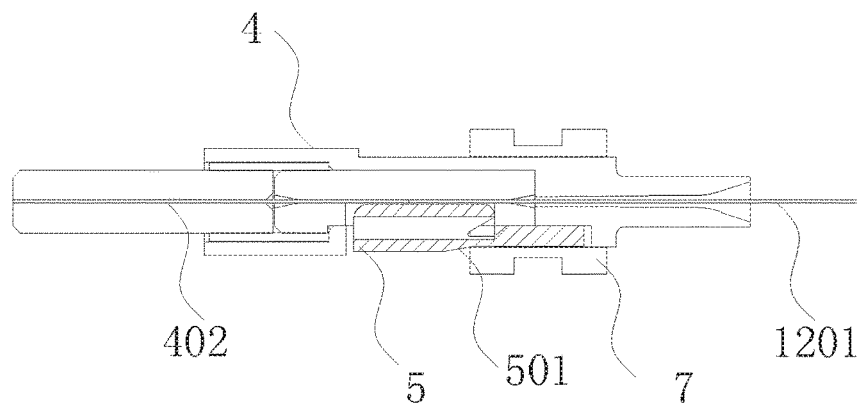
FIG. 7 is an assembled structural view of the insertion core assembly, the press block and the push member.

With reference to FIG. 7, in an embodiment of the present invention, an inclined portion 501 is provided on the press block 5; the push member 7 is movable relative to the press block 5 to reach different positions of the inclined portion 501; the press block 5 can impose greater or smaller pressure to the pre-embedded optical fiber 402 and the connecting optical fiber 1201 so as to press them tightly together or loosen them with respect to each other.

Therefore, a major function of the press block 5 is to connect the connecting optical fiber 1201 and the pre-embedded optical fiber 402 together under the action of the push member 7, so that the connecting optical fiber 1201 and the pre-embedded optical fiber 402 will not easily displace after connection. A user may push the push member 7 to press against the press block 5 to press tightly together or loosen the pre-embedded optical fiber 402 and connecting fiber 1201.

Figure 8:
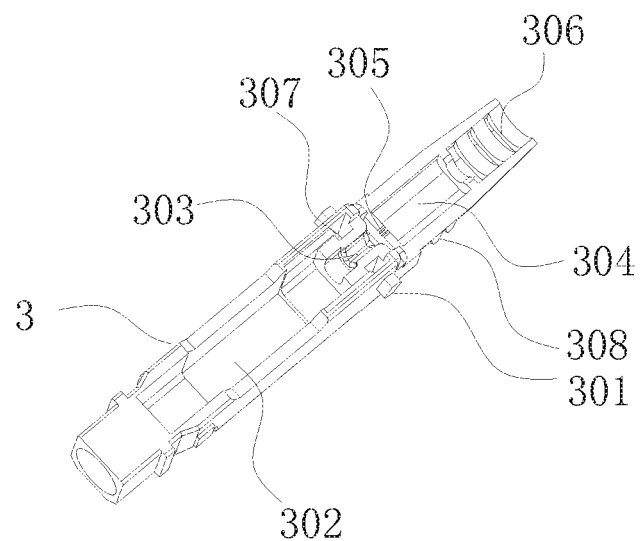
FIG. 8 is a perspective view of the inner core of the pre-embedded optical fiber quick connector.
Figure 9:
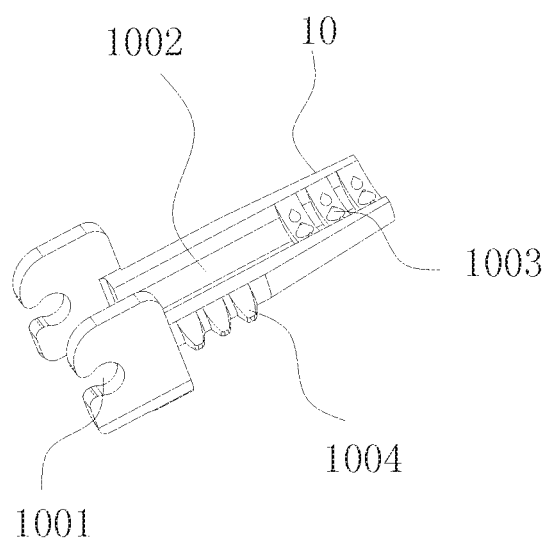
FIG. 9 is a perspective view of the intermediate component of the pre-embedded optical fiber quick connector.
Figure 10:
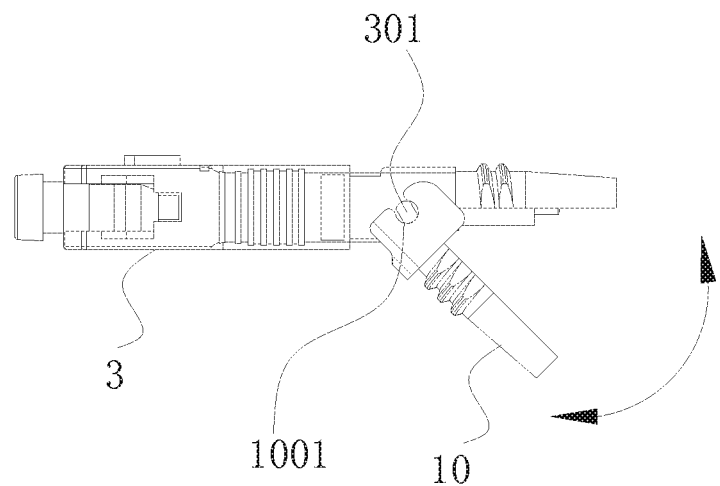
FIG. 10 is an assembled structural view of the inner core and the intermediate component.

FIGS. 8, 9, and 10 illustrate the inner core 3, the intermediate component 10 and the two assembled together respectively.

As shown in FIG. 8, in an embodiment of the present invention, the inner core 3 is provided with a first optical cable guiding hole 303 and a second optical cable guiding hole 305 to guide the optical cable during connection.

As shown in FIGS. 8-10, in an embodiment of the present invention, the inner core 3 is provided with a shaft 301; the intermediate component 10 is provided with holes 1001 that are cooperative with the shaft 301; the intermediate component 10 is rotatably mounted to the shaft 301 through the holes 1001. Apparently, the intermediate component 10, the holes 1001 on the intermediate components, and the shaft 301 on the inner core 3 form a rotatable structure which can open and close.

In an embodiment of the present invention, the intermediate component 10 can be assembled with the inner core 3 and the threaded tail sleeve 11 to fix the optical cable 12, and more specifically to fix the optical cable 12 with a specific diameter. The intermediate component 10 can be made of plastics, and has a structure that has a fixed shape and dimension to fix the optical cable with a certain diameter.

Figure 11:
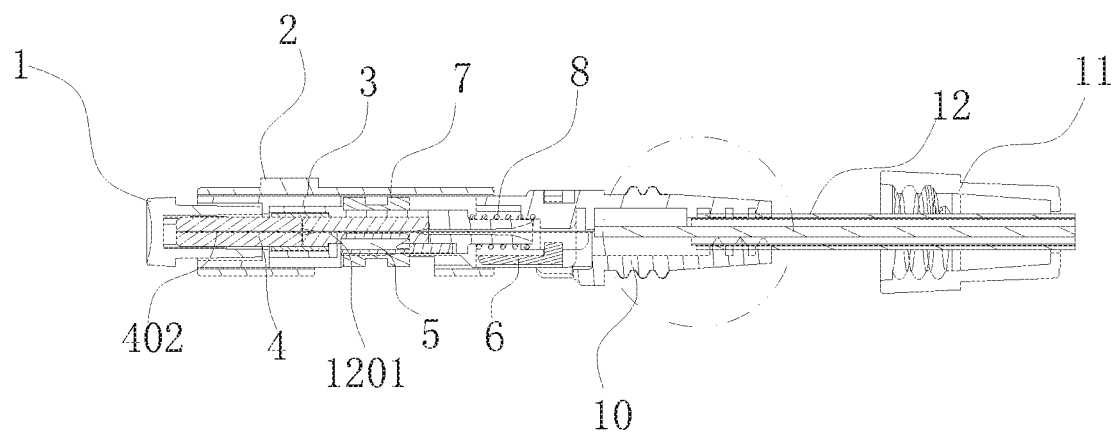
FIG. 11 is a schematic structural view of the fixation of an optical cable by an assembled structure of intermediate component, inner core and threaded tail sleeve.
Figure 12:
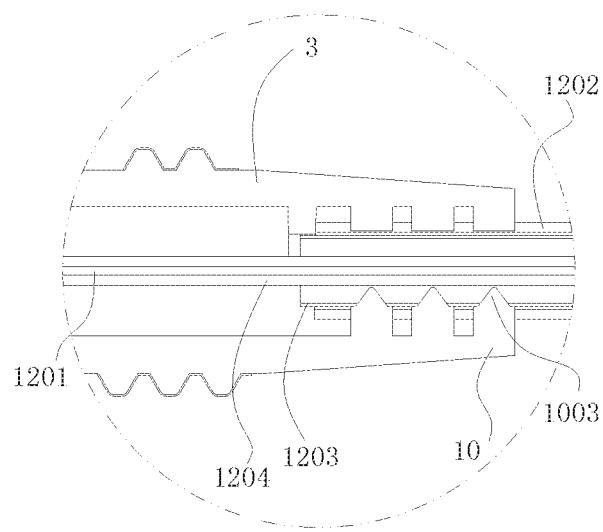
FIG. 12 is a partially enlarged view of FIG. 11.

With reference to FIGS. 11-12, the optical cable 12 comprises from inside to outside thereof the connecting optical fiber 1201, a coating layer 1204, craft wires 1203 and a jacket 1202.

When the optical cable is an optical cable with a nominal diameter, the intermediate component 10 cooperates with the inner core 3 and the threaded tail sleeve 11 to fix the optical cable with the nominal diameter.

In an embodiment of the present invention, an inner side wall of the intermediate component 10 has conical projections 1003 to fix the jacket 1202 of the optical cable with the nominal diameter. Also, the craft wires 1203 of the optical cable are partially embedded on threads of the inner core 3 and the intermediate component 10, and are fixed by the threaded tail sleeve 11 so as to form an anti-pulling structure. Specifically, the craft wires 1203 inside the optical cable 12 can wind onto the threads of the inner core 3 and the intermediate component 10 downwardly and upwardly respectively from close ends of the inner core 3 and the intermediate component 10, and then the threaded tail sleeve 11 is screwed tightly to form the anti-pulling structure, such that the optical cable 12 and the craft wires 1203 are fixed to the quick connector. The conical projections 1003 can cooperate with the inner core 3 to fix the jacket 1202. First threads 1004 of the intermediate component 10 can cooperate with second threads 308 of the inner core 3 to assemble the threaded tail sleeve and to fix the craft wires 1203 of the optical cable 12.

To increase the types of optical fibers that can be connected, the quick connector of the present invention also provides a modified structure to accommodate optical cables of other diameters.

Figure 13:
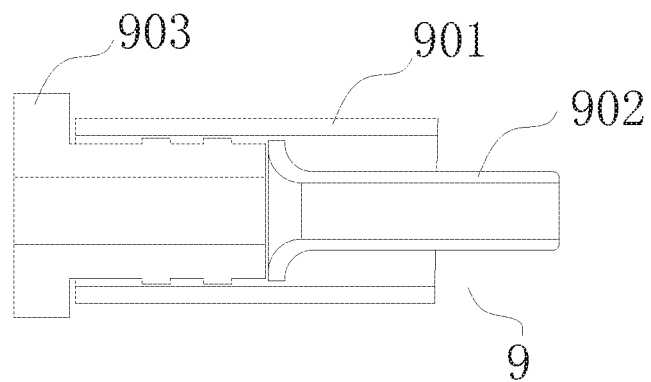
FIG. 13 is a cross sectional view of a press connection assembly of the pre-embedded optical fiber quick connector.
Figure 14:
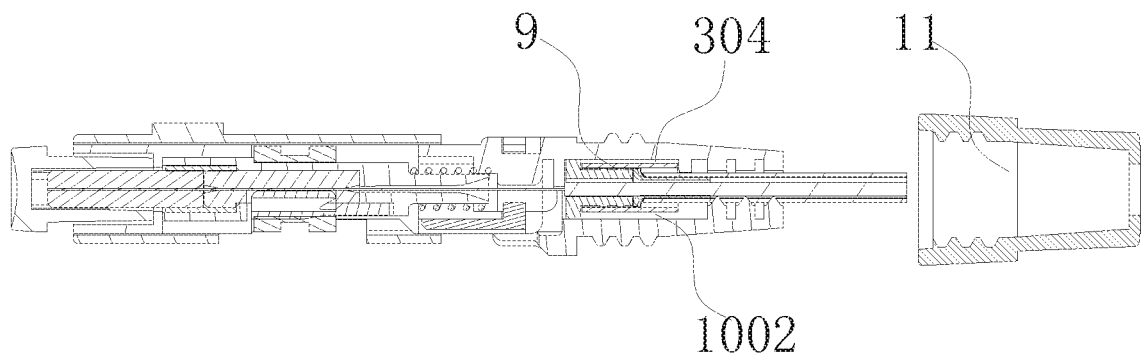
FIG. 14 is a schematic structural view of the fixation of the optical cable by the inner core and the press connection assembly.
Figure 15:
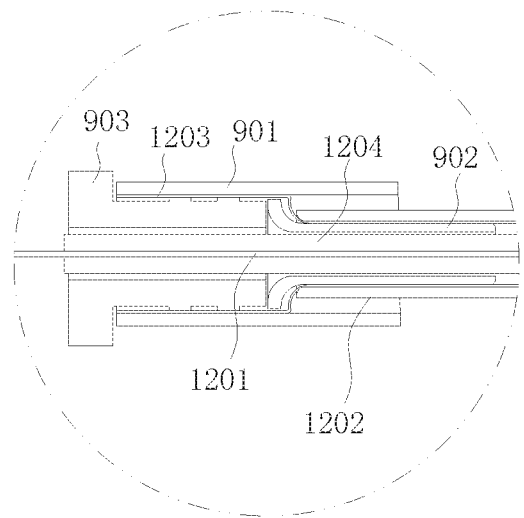
FIG. 15 is a partially enlarged view of FIG. 14.

In an embodiment shown in FIGS. 13-15, when the optical cable 12 has a diameter smaller than the nominal diameter, the present invention may also comprise a press connection assembly 9 provided between the inner core 3 and the intermediate component 10 to fix such optical cable having a smaller diameter.

The press connection assembly 9 comprises a press ring 901, and a pin 902 and a stop ring 903 provided inside the press ring 901. When fixing an optical cable having a smaller diameter, a stop structure is formed by the pin 902 inserted between the coating layer 1204 and the craft wires 1203, and the craft wires 1203 partially embedded between the stop ring 903 and the press ring 901.

In an embodiment, a first trough 1002 is provided on the intermediate component 10; a second trough 304 is provided on the inner core 3; cooperation between the first trough and the second trough can fix the press connection assembly 9; the press connection assembly 9 can be mounted in the first trough 1002 and the second trough 304.

As explained above, the inner core 3 is an essential component of the present invention. A third trough 302 is provided on the inner core 3 to allow the push member 7 to move inside free of obstructions. The first optical cable guiding hole 303 and the second optical cable guiding hole 305 are provided to reduce the difficulty of optical fiber connection. The second trough 304 of the inner core cooperates with the first trough 1002 of the intermediate component 10 to fix the press connection assembly 9; internal projections 306 provided on the inner core 3 cooperate with the intermediate component 10 to fix the jacket 1202 of the optical cable.

As said above, the present invention provides a pre-embedded optical fiber quick connector that mainly comprises the following components: the dust proof cap 1, the outer casing 2, the inner core 3, the insertion core assembly 4, the press block 5, the cover panel 6, the push member 7, the spring 8, the press connection assembly 9, the intermediate component 10 and the threaded tail sleeve 11.

As said, the quick connector of the present invention has a pre-embedded optical fiber pre-embedded in the quick connector. Since an end surface of the optical fiber is already processed by for example fine industrial grinding in the factory where it is produced, the present invention has a more steady performance against insertion loss and return loss due to insertion and removal of the optical fiber; also, index matching gel for optical fibers can be used for connection of optical fibers to lower the technique required for operation, and thus lowering the technical requirements of the user.

The first opening 201 is provided on the outer casing 2 in the quick connector of the present invention so that the push member 7 can be manipulated directly by a user without removing the outer casing such that under the pressure of the press block, the pro-embedded fiber and the connecting fiber are fixed or loosened with respect to each other. If the connection is found problematic and fails to meet the standards, the user can manipulate the push member to tighten or loosen the connecting portion, and the optical cable can be taken out by removing the threaded tail sleeve so that the optical cable can be re-connected and tightened again without disassembling the outer casing or an outer shell whatever, thereby facilitating convenient adjustment.

Further, guiding structures that comprise the first optical cable guiding hole, the second optical cable guiding hole, and the groove having the cross section of partial circular shape and having the barbed edges at two sides of an opening of the groove etc facilitate easier optical fiber connection.

The intermediate component and the press connection assembly are provided at a rear end of the fixation of an optical cable, such that the present invention has two different ways of connection to accommodate optical cables having different diameters. As such, the present invention can accommodate optical cables having different diameters to be connected.

In view of the above, the present invention provides a pre-embedded optical fiber quick connector to improve the quality of connection between optical fibers to ensure that displacement of the optical fibers will not occur easily. Also, the present invention has reduced the difficulty of its operation to facilitate convenient adjustment.

Each of the embodiments described above has its unique main focus. However, detailed structures not mentioned in a particular embodiment may be consulted with reference to the description of other embodiments.

The embodiments described above are only intended to illustrate the technical solutions of the present invention, and should not limit the present invention. A person skilled in this field of art may modify the technical solutions described in the above embodiments or replace some of the above disclosed technical features by other technical means having equivalent technical effects, and these modifications and replacements will not render the essence of the technical solutions to deviate from the spirit and scope of the technical solutions disclosed in the aforementioned embodiments of the present invention.

What is claimed is:

1. A pre-embedded optical fiber connector, comprising an inner core (3), an insertion core assembly (4) embedded inside the inner core (3), an outer casing (2) that sleeves on the inner core (3), and an intermediate component (10) and a threaded tail sleeve (11) mounted on the inner core (3); a pre-embedded optical fiber (402) is provided inside the insertion core assembly (4); an optical cable (12) to be connected is inserted into an insertion channel formed by the inner core (3) and the intermediate component (10); a connecting optical fiber (1201) inside the optical cable (12) is inserted into the insertion core assembly (4); wherein:

a press block (5) and a push member (7) corresponding to the press block (5) are provided on the insertion core assembly (4); the push member (7) is exposed from a first opening (201) provided on the outer casing (2); the push member (7) is slidable when subject to a pushing force; the press block (5) presses against and fixes the pre-embedded optical fiber (402) and the connecting optical fiber (1201), and a pressure of the press block (5) on the pre-embedded optical fiber (402) and the connecting optical fiber (1201) varies depending on different positions of the push member (7).

2. The pre-embedded optical fiber connector of claim 1, wherein an inclined portion (501) is provided on the press block (5); the push member (7) is slidable relative to the press block (5) to reach different positions of the inclined portion (501) so as to impose different degrees of pressure to the pre-embedded optical fiber (402) and the connecting optical fiber (1201) so as to press the pre-embedded optical fiber (402) and the connecting optical fiber (1201) tightly together or loosen the pre-embedded optical fiber (402) and the connecting optical fiber (1201) with respect to each other.

3. The pre-embedded optical fiber connector of claim 1, wherein a groove (4051) having a cross section of a partial circular shape and having barbed edges (4052) at two sides of an opening of the groove respectively is provided inside the insertion core (4); the pre-embedded optical fiber (402) and the connecting optical fiber (1201) are inserted into the groove (4051) to complete mutual connection, and are confined within the groove (4051) by the barbed edges (4052).

4. The pre-embedded optical fiber connector of claim 1, wherein the inner core (3) is provided with a first optical cable guiding hole (303) and a second optical cable guiding hole (305) to guide the optical cable during connection.

5. The pre-embedded optical fiber connector of claim 1, wherein the optical cable (12) comprises from inside to outside thereof the connecting optical fiber (1201), a coating layer (1204), craft wires (1203) and a jacket (1202); when the optical cable (12) is an optical cable with a nominal diameter, the intermediate component (10) cooperates with the inner core (3) and the threaded tail sleeve (11) to fix the optical cable with the nominal diameter; when the optical cable (12) has a diameter smaller than the nominal diameter, the connector also comprises a press connection assembly (9) provided between the inner core (3) and the intermediate component (10) to fix such optical cable having a smaller diameter.

6. The pre-embedded optical fiber connector of claim 5, wherein an inner side wall of the intermediate component (10) has conical projections (1003) to fix the jacket (1202) of the optical cable with the nominal diameter; the craft wires (1203) of the optical cable with the nominal diameter are partially embedded on threads of the inner core (3) and the intermediate component (10), and are fixed by the threaded tail sleeve (11) so as to form an anti-pulling structure.

7. The pre-embedded optical fiber connector of claim 5, wherein the press connection assembly (9) comprises a press ring (901), and a pin (902) and a stop ring (903) provided inside the press ring (901); when fixing the optical cable having the smaller diameter, a stop structure is formed by the pin (902) inserted between the coating layer (1204) and the craft wires (1203), and the craft wires (1203) partially embedded between the stop ring (903) and the press ring (901).

8. The pre-embedded optical fiber connector of claim 5, wherein a first trough (1002) is provided on the intermediate component (10); a second trough (304) is provided on the inner core (3); the press connection assembly (9) is mounted in the first trough (1002) and the second trough (304).

9. The pre-embedded optical fiber connector of claim 1, wherein the insertion core assembly (4) is mounted into the inner core (3) via a spring (8) and a cover panel (6); after installation of the spring (8), the spring (8) is in a compressed state which presses the insertion core assembly (4) tightly into the inner core (3); two resilient walls (601) of the cover panel (6) are cooperative with second openings (307) provided on the inner core (3), so as to limit the spring (8) in a position within the inner core (3).

10. The pre-embedded optical fiber connector of claim 1, wherein index matching gel is used during connection between the pre-embedded optical fiber (402) and the connecting optical fiber (1201).

* * * * *